United States Patent [19]
Howie, Jr.

[11] Patent Number: 5,942,313
[45] Date of Patent: Aug. 24, 1999

[54] METHOD OF MANUFACTURING A COMPOSITE ARTICLE HAVING A HIGH CLARITY ICON AND THE PRODUCT PRODUCED BY THE METHOD

[75] Inventor: Robert K. Howie, Jr., Decatur, Ill.

[73] Assignee: The Grigoleit Company, Decatur, Ill.

[21] Appl. No.: 09/110,336

[22] Filed: Jul. 6, 1998

Related U.S. Application Data

[60] Division of application No. 08/878,905, Jan. 19, 1997, Pat. No. 5,811,175, which is a continuation-in-part of application No. 08/583,522, Jan. 5, 1996, Pat. No. 5,641,556.

[51] Int. Cl.$^6$ .................................................. B32B 9/00
[52] U.S. Cl. ........................ 428/195; 428/159; 428/161; 428/204; 428/237; 428/256; 428/318.8; 428/357; 428/913; 411/82; 411/427; 264/45.5; 264/46.5; 264/115
[58] Field of Search .................................... 428/159, 161, 428/237, 256, 204, 195, 318.8, 357, 913; 264/46.5, 45.5, 115, 119; 411/82, 427

[56] References Cited

U.S. PATENT DOCUMENTS

| | | | |
|---|---|---|---|
| 2,185,492 | 1/1940 | Barrett | 264/139 |
| 2,193,586 | 3/1940 | Fischett | 264/139 |
| 2,285,963 | 6/1942 | Gits et al. | 16/121 |
| 2,565,803 | 8/1951 | Danielson et al. | 264/135 |
| 2,831,453 | 4/1958 | Hardes | 116/288 |
| 3,514,366 | 5/1970 | Allport | 428/162 |
| 3,543,329 | 12/1970 | Gulette et al. | 16/121 |
| 3,549,733 | 12/1970 | Caddell | 264/400 |
| 4,155,972 | 5/1979 | Hauser et al. | 264/250 |
| 4,395,817 | 8/1983 | Asada et al. | 29/622 |
| 4,536,116 | 8/1985 | Murray | 411/427 |
| 4,603,065 | 7/1986 | Mori et al. | 428/31 |
| 4,893,392 | 1/1990 | Stricker et al. | 29/896.5 |
| 5,050,269 | 9/1991 | Engstrom et al. | 16/118 |
| 5,098,633 | 3/1992 | Hausler | 264/511 |
| 5,252,798 | 10/1993 | Kamada | 200/314 |
| 5,376,314 | 12/1994 | Share et al. | 264/400 |
| 5,407,721 | 4/1995 | Fujigaki et al. | 428/72 |
| 5,477,024 | 12/1995 | Share et al. | 200/314 |
| 5,477,430 | 12/1995 | LaRose | 219/121.69 |
| 5,512,718 | 4/1996 | Larose | 200/314 |
| 5,514,319 | 5/1996 | Young | 264/132 |

*Primary Examiner*—Deborah Jones
*Assistant Examiner*—Abraham Bahta
*Attorney, Agent, or Firm*—Dorn, McEachran, Jambor & Keating

[57] ABSTRACT

A method of manufacturing an injection molded object having an outer shell with a front face and a light transmitting assembly molded into the outer shell which assembly is visible from the front face. The method includes the following steps. Supporting a light transmitting assembly on a mold projecting tool which is closable with a mold cavity tool having an interior wall which defines the front wall of the outer shell. Forming narrow passages through the light transmitting assembly to connect its front and rear faces. Closing the mold to position the front face of the light transmitting assembly adjacent the interior wall of the mold cavity tool while leaving a narrow peripheral recess therearound in communication with the narrow passages. Injecting a molten plastic into the closed mold to form the outer shell of the object while also flowing the molten plastic through the narrow passages in the light transmitting assembly and the narrow peripheral recess between the front face of the light transmitting assembly and the interior wall of the mold projecting tool. Separating the injected plastic filling the narrow passages of the light transmitting assembly from the injected plastic filling the narrow recess upon separation of the mold projecting tool and the mold cavity tool.

4 Claims, 2 Drawing Sheets

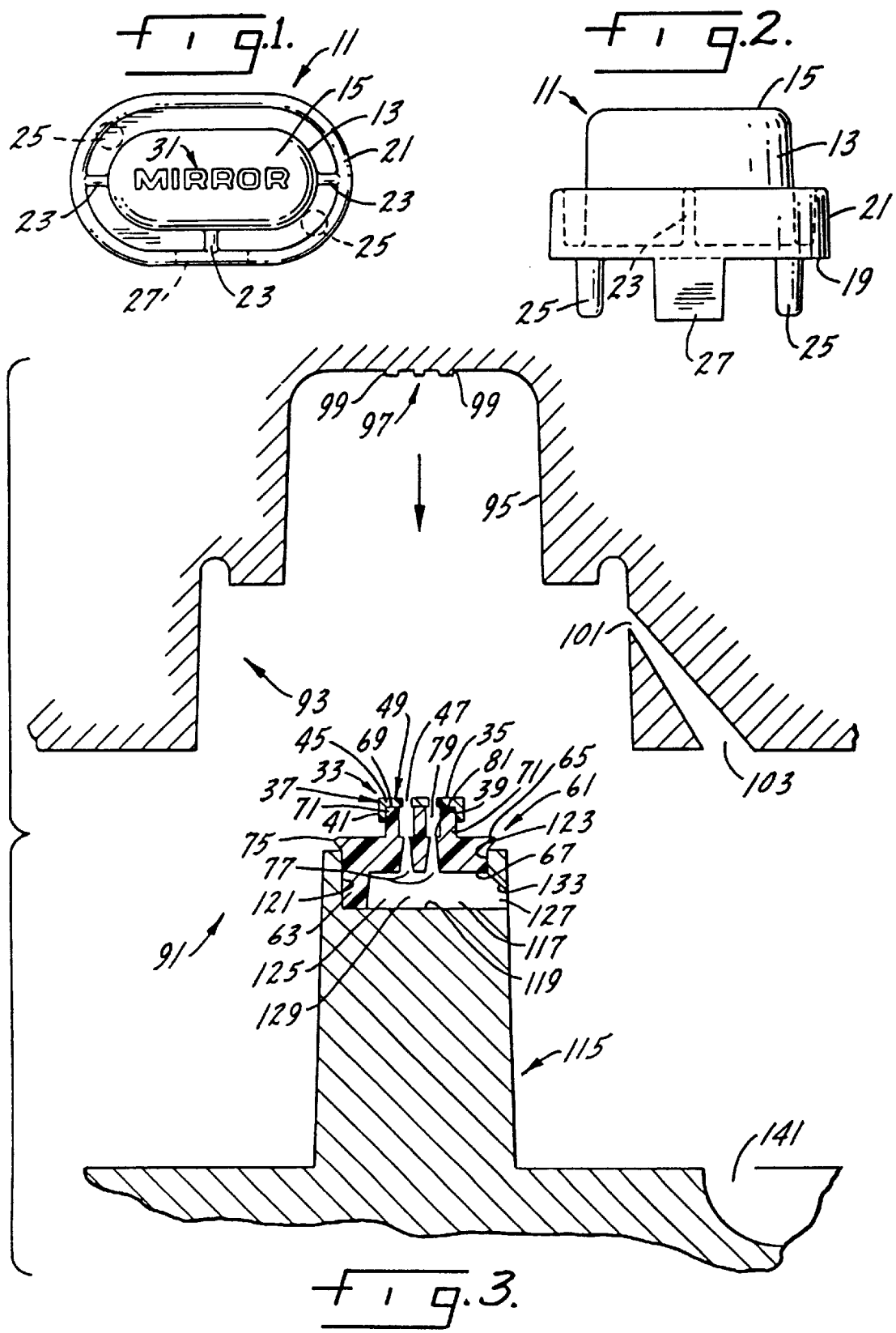

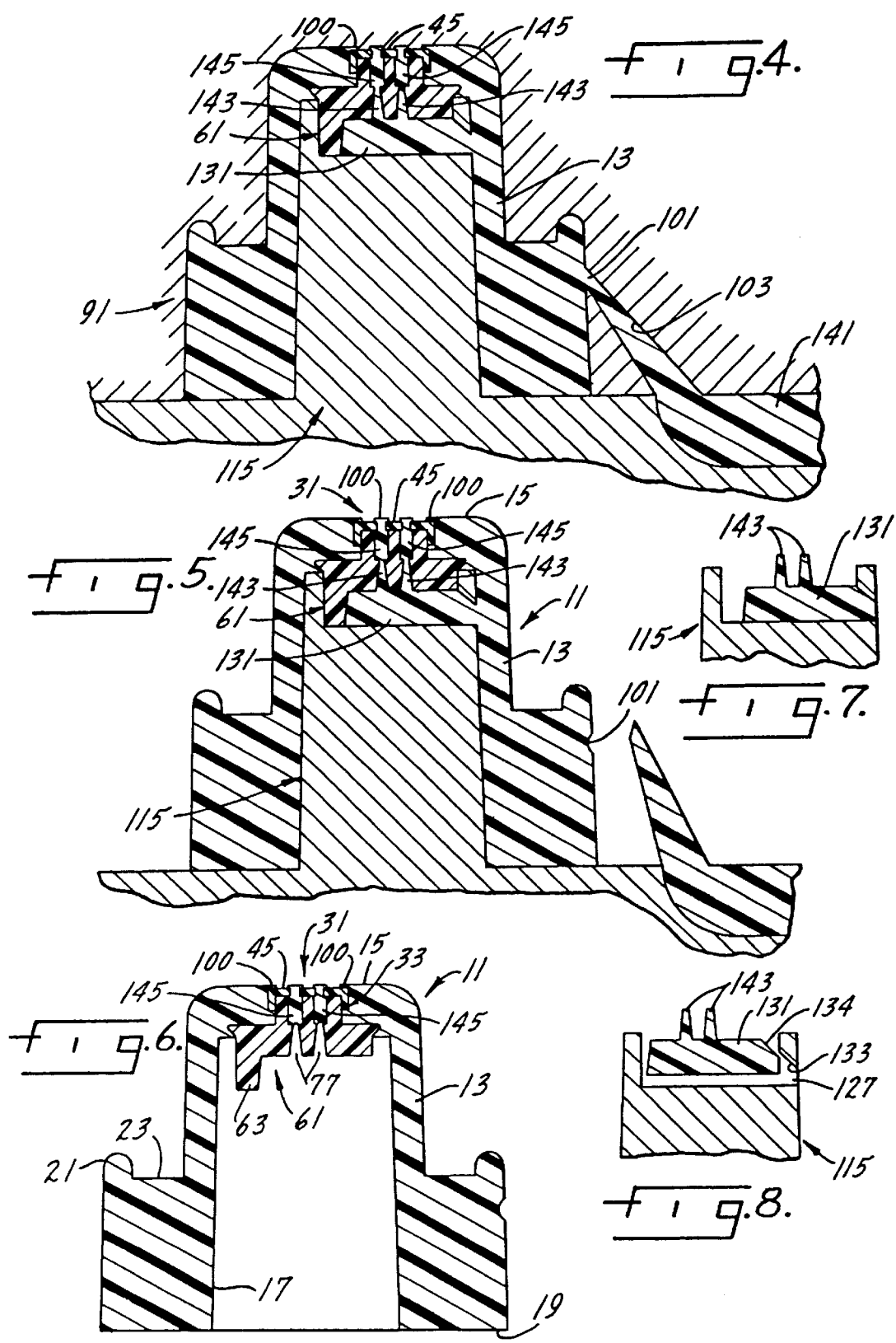

METHOD OF MANUFACTURING A COMPOSITE ARTICLE HAVING A HIGH CLARITY ICON AND THE PRODUCT PRODUCED BY THE METHOD

This application is a division of my application Ser. No. 08/878,905, filed Jan. 19, 1997, now U.S. Pat. No. 5,811,175, which is a continuation-in-part of application Ser. No. 08/583,522, filed Jan. 5, 1996, now U.S. Pat. No. 5,641,556, both of which are incorporated herein by reference.

BACKGROUND AND SUMMARY OF THE INVENTION

This invention is directed to an improvement in the method of manufacturing a composite article having a high clarity icon and an improved article produced by the method. My prior method and article are disclosed in my patent application Ser. No. 08/583,522, filed Jan. 5, 1996, now U.S. Pat. No. 5,641,556 and assigned to the same assignee as this application, which patent application and patent are incorporated herein by reference. One aspect of my previous method involved the injection molding of an opaque plastic from the rear surface of a composite article through passages formed in a light transmitting anvil and a core to assist in forming a thin front layer of opaque plastic around the front of the icon without forming what are called "weld lines" which may occur when a molten plastic is flowed in a thin layer over a relatively wide area. When more complex icons are created, especially icons formed of a string of letters creating a word, the icon so formed is more likely to be elongated in one direction thus requiring passages in the anvil to be spaced along the elongated dimension of the composite article. To properly supply a molten plastic to these passages, a sprue runner is provided across the base of the light transmitting anvil. In the completed composite article, such a runner would obstruct the passage of light through the light transmitting anvil and core.

Therefore, an object of this invention is a method of manufacturing a composite article having an icon in its front face which method permits the formation of a thin layer of plastic over the front face of the composite article, which article is elongated in at least one dimension, by flowing the molten plastic through passages formed in a light transmitting anvil and core without diminishing the light transmitting qualities of the icon formed in the front face of the article.

Another object of this invention is a method of removing the molten opaque plastic deposited in the passages of a light transmitting anvil in a composite article without disturbing the thin layer of plastic deposited over the front face of the composite article surrounding an icon.

A further object of this invention is a method of removing the molten opaque plastic deposited in the passages of the light transmitting anvil and contained in a sprue runner which is attached to the deposited plastic and ejecting the plastic during the molding process.

Yet another object of this invention is a composite plastic object having an elongated icon on the front face of the object which icon is surrounded by a thin opaque layer of plastic which is free of "weld lines".

Still another object of this invention is a composite plastic object having a backlighted elongated icon which is interlocked with its outer shell without significant loss of its light transmitting ability.

Other objects may be found in the following specification, claims and drawings.

BRIEF DESCRIPTION OF THE DRAWINGS

The invention is illustrated more or less diagrammatically in the following drawings wherein:

FIG. 1 is a top plan view of a plastic article such as a button made in accordance with the teachings of this invention with some hidden parts shown in dashed lines;

FIG. 2 is a side elevational view of the button of FIG. 1 with some hidden parts shown in dashed lines;

FIG. 3 is a cross sectional, somewhat schematic representation of a mold tool for molding the article of FIGS. 1 and 2, shown in an open position with a core and anvil carried by the tool;

FIG. 4 shows the mold tool of FIG. 3 in its closed position with the plastic forming the outer shell of the composite article injected into the mold;

FIG. 5 is a partial view of the molding tool of FIG. 4 with the finished composite article retracted from the mold;

FIG. 6 is a cross sectional view of the finished molded composite article;

FIG. 7 is a partial cross sectional view showing the removal of the sprue runner from the finished composite article; and FIG. 8 is a partial cross sectional view showing a step in the removal of the sprue runner from one of the molding tools.

DESCRIPTION OF THE PREFERRED EMBODIMENTS

FIGS. 1, 2 and 6 of the drawings show the invention embodied in a button 11 which, by way of example and not by way of limitation, may be of the type which is installed on the dashboard of a motor vehicle. The invention can also be applied to a variety of composite injection molded plastic articles, especially those in which light is to be transmitted through icons of otherwise opaque structures. The button 11 of this invention includes an opaque shell 13 which is somewhat elliptical in transverse cross section. The shell includes a front wall 15 of somewhat elliptical shape and a rearwardly opening cavity 17 terminating in an annular peripheral base 19. An outer, half high skirt 21 is upstanding on the annular base 19 to partially surround the opaque shell 13. Ribs 23 are molded integrally between the shell 13 and the outer skirt 21. Mounting pins 25 extend downwardly as viewed in the drawings from the annular base 19 as does an actuation plate 27 for an electric switch (not shown). The mounting pins may be fitted into spring loaded sockets to mount the button 11.

Formed on the front wall 15 of the button 11 is an icon 31 forming the word "MIRROR". This icon must be visible to the user both in natural light such as in the daytime and under darkened conditions and, therefore, is backlighted. The term "icon", as used in the specification and claims, encompasses not only words, such as the word "MIRROR" shown in FIG. 1 of the drawings, but also includes graphic configurations, numerals, indicator lines, trademarks, logos, symbols and any other type of a representation which conveys information to or can be recognized by a user.

The button 11 and its icon 31 are built around a core 33 which has a front face 35 formed on a front wall 37, a rear face 39, depending side walls 41 and depending end walls (not shown). This core includes as portions of its front wall 37, imperforate portions 45 and perforate portions 47 which together create the design of the stencil 49 which defines the icon 31. In this embodiment of the invention, the imperforate portions 45 create the letters of the word "MIRROR" but some of what would normally be perforate portions between the letters are covered by a thin, translucent, plastic membrane for reinforcing purposes, which membrane is not shown in the drawings for clarity of illustration. To maintain the clarity of the word "MIRROR", the only perforate portions 47 provided in core 33 are located so that they extend through the openings in the "O" and in the "R"s of the word "MIRROR".

The core 33 in this embodiment is formed of a white plastic such as an acetal with some of its imperforate portions 45 having fine definitions and thicknesses of only slightly more than ten-one thousandths of an inch. A plastic core molded to such fine definitions and minimum dimensions has been obtained by using electroerosive metal cutting techniques to form the molds and tooling used to create parts such as the core 33, especially the imperforate portions 45 and perforate portions 47 of the stencil 49. The use of electroerosive metal cutting techniques increases the definition of the portions forming the stencil by eliminating the concave and convex fillets in molds and tools formed by conventional cutting equipment.

To provide additional support for the stencil 49 during subsequent molding operations, an anvil 61 is provided. The anvil 61 of this embodiment of the invention is formed of a light transmitting polycarbonate to enable the anvil to also function as a light pipe to backlight the icon 31. The anvil 61 is formed with a downwardly extending (as viewed in the drawings) rib 63 extending along one end thereof, a front face 65 and a rear face 67. Supporting surfaces 69 are formed on the upper ends of projections 71 extending from the front face 65. Although not shown in the drawings for clarity of illustration, longitudinally extending ribs are provided between the projections 71 and these longitudinally extending ribs terminate slightly below the supporting surfaces 69 of the projections 71. End shoulders 75 are integrally formed on the anvil. Tapered passages 77 are formed through the anvil 61 and are aligned with passages 79 extending through the projections 71. The passages 79 are wider than the tapered passages 77 thus forming shoulders 81 at the boundaries between the passages 77 and the passages 79.

FIGS. 3, 4, 5, 7 and 8 of the drawings show, in a schematic manner for clarity of illustration and explanation, a mold tooling 91 having complementary cavity and projection tools. The mold tooling 91 includes a first mold cavity 93 having an interior wall 95 which defines the opaque shell 13 of the button 11. For clarity of illustration and explanation, some of the elements of the mold tooling forming the various details of the button 11 have been omitted from the drawings. Also formed on the interior wall 95 of the mold cavity 93 and projecting inwardly thereof is an icon shielding tool 97. The icon shielding tool has facing surfaces which are the same shape, but slightly smaller, than the imperforate portions 45 of the stencil 49 which defines the icon 31. This smaller "footprint" of the icon shielding tool provides a recess 99 in the mold cavity 93, most clearly shown in FIGS. 3, 4, 5 and 6 of the drawings, around the peripheries of the imperforate portions 45 of the stencil. The icon shielding tool 97 prevents the later injected opaque plastic from flowing over and filling in the imperforate portions 45 of the stencil while allowing the opaque plastic to fill the recess 99 and thus form narrow borders 100 around the letters forming the icon. The narrow borders 100 surround the letters of the icon 31 to tightly encapsulate the stencil 49 while still sharply delineating the icon 31. A gate 101 is formed in the interior wall 95 of the mold cavity 93 and leads to a sprue passage 103 in the mold cavity tool.

A mold projection tool 115 is formed with a well 117 defined by a bottom wall 119, end walls 121 and 123 and side walls, one of which, side wall 125, is shown in the drawings, to receive and support the anvil 61 with the end shoulders 75 of the anvil resting on and being supported by the end walls 121 and 123 of the mold projection tool. The rib 63 of the anvil engages the bottom wall 119 of the well and obstructs the end wall 121 thereof. A passage 127 extends through the end wall 123 to allow the flow of molten plastic against the rear face 67 and rib 63 of the anvil 61 to form a chamber 129 which defines a sprue runner 131. The passage 127 is formed with a sloped upper wall 133 which forms a complementary sloped wall 134 on the sprue runner for assisting in removing the sprue runner 131 in a manner to be hereinafter described.

In manufacturing the button 11 of this invention, the core 33 is positioned on the anvil 61 and both are mounted on the mold projection tool 115 as shown in FIG. 3 of the drawings. Then the mold is closed and the molten plastic is injected into the mold cavity 93 through a sprue 141, sprue passage 103 and gate 101. The molten opaque plastic then flows around the mold projection tool 115 and against the interior wall 95 of the mold tool to form the front wall 15 and the remainder of the shell 13 of the button 11. It also flows into the recess 99 between the core 33 and the interior wall 95 of the mold cavity 93. Molten plastic also flows through the passage 127 in the end wall 123 of the mold projection tool to fill the chamber 129 formed between the mold projection tool 115, the rear face 67 and the downwardly extending rib 63 of the anvil 61. The molten plastic then flows through the tapered passages 77 formed in the anvil 61 and into the passages 79 formed in the projections 71 of the anvil 61 to fill the spaces between the projections and the stencil 49.

Upon retraction of the mold projection tool 115 from the mold cavity 93 as shown in FIG. 5 of the drawings, the sprue nozzle 103 is separated from the shell 13 at the gate 101 of the mold cavity. As the mold projection tool continues to retract, knockout pins (not shown) arrest movement of the button 11, allowing the mold projection tool to separate from the newly formed button taking the sprue runner 131 and the protuberances 143 of plastic that formerly filled the tapered passages 77 of the anvil 61 away with the runner as shown in FIG. 7 of the drawings. The protuberances 143 separate from the molten plastic originally injected into the tapered passages 77 and passages 79 at the shoulders 81 between these passages. Thus, the plastic 145 is retained in the passages 79 formed in the projections 71 of the anvil 61. Continued retracting movement of the mold tool 115 brings ejector pins (not shown) in contact with the sprue runner 131 and attached protuberances 143 to move the sprue runner laterally, as shown in FIG. 8 of the drawings, into the void space formerly occupied by the downwardly extending rib 63 of the anvil 61. This movement to the left as viewed in FIGS. 7 and 8 of the drawings moves the sloped end wall 134 of the sprue runner out of the passage 127 in the mold projection tool to allow the sprue runner to be ejected.

As can be seen in FIG. 6 of the drawings, the button 11 in its finished form has an anvil 61 with sprue runners and protuberances 143 of injected plastic removed to provided maximum light passage through the anvil and its projections to the imperforate portions 45 of the core which provide the image of the icon 31 when viewed from the front face of the button 11. The injection molded plastic 145 remaining in the passages 79 formed in the projections additionally interlocks the anvil with the core and with the opaque shell 13 of the button as do the shoulders 81 of the anvil.

I claim:

1. A composite article having an icon on a front face thereof, said article including:
   a core having a front face and a rear face with portions of said core forming a stencil defining said icon,
   an opaque plastic layer formed on said front face of said core covering said stencil except for substantially all of said icon portion thereof,
   openings extending through said core connecting said front and rear faces, and
   an anvil of a light transmitting plastic having supporting surfaces in the shape of said icon and dimensioned to seat in supporting engagement with said portions of said stencil defining said icon,
   said anvil having passages extending therethrough to communicate with said openings of said core,
   said opaque plastic forming said layer also extending through said openings of said core and partially through said passages in said anvil to interlock said core and said anvil.

2. The composite article of claim 1 in which said passages in said anvil are tapered in the direction of said core and are expanded laterally adjacent said core to form shoulders to limit the partial penetration of said opaque plastic through said anvil.

3. A composite article including,
   a core having a front face and a rear face with a portion of said front face defining an icon,
   an anvil having a supporting surface in the shape of said icon and seated in supporting engagement with said portion of said core defining said icon, and
   a plastic layer covering said front face of said core except for at least a substantial area of said portion of said front face defining said icon.

4. The composite article of claim 3 in which said plastic layer covering said front face of said core forms a narrow border around said portion of said front face defining said icon.

* * * * *